US 9,535,656 B2

(12) United States Patent
Condorelli et al.

(10) Patent No.: US 9,535,656 B2
(45) Date of Patent: Jan. 3, 2017

(54) PIPELINED MODULAR REDUCTION AND DIVISION (71) Applicant: International Business Machines Corporation, Armonk, NY (US)

(72) Inventors: Vincenzo Condorelli, Poughkeepsie, NY (US); Silvio Dragone, Winterthur (CH); William Santiago Fernandez, Poughkeepsie, NY (US); Nihad Hadzic, Wappingers Falls, NY (US); Andrew R. Ranck, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 294 days.

(21) Appl. No.: 14/210,966

(22) Filed: Mar. 14, 2014

(65) Prior Publication Data

US 2015/0261499 A1  Sep. 17, 2015

(51) Int. Cl.
*G06F 5/01* (2006.01)
*G06F 7/72* (2006.01)

(52) U.S. Cl.
CPC .. *G06F 5/01* (2013.01); *G06F 7/72* (2013.01)

(58) Field of Classification Search
None
See application file for complete search history.

(56) References Cited

U.S. PATENT DOCUMENTS 6,845,410 B1    1/2005  Brown et al.
6,925,563 B1 *  8/2005  Jennings .............. H04L 9/0894
                                            708/491
8,011,592 B2    9/2011  Wang
2002/0116430 A1  8/2002  Chen et al.
2002/0161810 A1 10/2002  Mellott et al.
2004/0015532 A1  1/2004  Ikeda et al.
2004/0167952 A1  8/2004  Gueron et al.
2004/0225702 A1 11/2004  Son
2009/0089350 A1  4/2009  Sauzet et al.
2010/0011047 A1  1/2010  Jackson et al.
2011/0299317 A1 12/2011  Shaeffer et al.
2012/0078993 A1  3/2012  Bui et al.

(Continued)

OTHER PUBLICATIONS

Kornerup, Peter "High-Radix Modular Multiplication for Cryptosystems", Dept. of Mathematics and Computer Science, Odense University, Mar. 1993, pp. 1-13.

(Continued)

*Primary Examiner* — Michael D Yaary
(74) *Attorney, Agent, or Firm* — Cantor Colburn LLP; Steven Chiu (57) ABSTRACT Embodiments relate to modular reductions. An aspect includes a system to perform modular reductions. The system includes a shift register to store an input string or number. The system also includes a plurality of processing elements arranged in a pipeline configuration to convert the input string to a predefined alphabet or to convert the number to a different base based on a plurality of modular reductions, an output of one of the plurality of processing elements being an input to a subsequent one of the plurality of processing elements in the pipeline as part of a recursive division, and an input of a first one of the plurality of processing elements in the pipeline being an output of the shift register.

20 Claims, 5 Drawing Sheets (56) References Cited

U.S. PATENT DOCUMENTS

| | | |
|---|---|---|
| 2012/0089658 A1 | 4/2012 | Woo et al. |
| 2012/0213360 A1 | 8/2012 | Le Quere |
| 2012/0331207 A1 | 12/2012 | Lassa et al. |
| 2013/0148437 A1 | 6/2013 | Bronner et al. |
| 2013/0305008 A1 | 11/2013 | Kwon et al. |
| 2013/0311532 A1* | 11/2013 | Olsen ................. G06F 9/30025 708/491 |
| 2013/0311533 A1 | 11/2013 | Lee et al. |
| 2014/0006688 A1 | 1/2014 | Yu et al. |

OTHER PUBLICATIONS

List of IBM Patents or Patent Applications Treated as Related; (Appendix P), Filed Apr. 5, 2016; 2 pages.
Vincenzo Condorelli et al., "Pipelined Modular Reduction and Division", U.S Appl. No. 15/090,908, filed Apr. 5, 2016.

\* cited by examiner

PIPELINED MODULAR REDUCTION AND DIVISION

BACKGROUND

The present invention relates generally to encryption and computation, and more specifically, to modular reduction algorithms.

In encryption and computation algorithms, alphabet conversion or conversion of numbers from binary to any base, for example, may be necessary. For example, the format preserving encryption (FPE) algorithm, VISA FPE (VFPE), requires alphabet conversion. This alphabet conversion, as well as conversion from binary to a different base or computation (e.g., banking computation) requires the performance of several modular reductions of the quotients resulting from division by predefined constants.

SUMMARY

Embodiments include a system and method to perform modular reductions and a modular reduction module. The system to perform modular reductions includes a shift register to store an input string or number. The system also includes a plurality of processing elements arranged in a pipeline configuration to convert the input string to a predefined alphabet or to convert the number to a different base based on a plurality of modular reductions, an output of one of the plurality of processing elements being an input to a subsequent one of the plurality of processing elements in the pipeline as part of a recursive division, and an input of a first one of the plurality of processing elements in the pipeline being an output of the shift register.

The method for implementing modular reductions includes loading a shift register with an input string or number. The method also includes converting, by a plurality of processing elements arranged in a pipeline configuration, the input string to a predefined alphabet or the number to a different base based on a plurality of modular reductions, wherein an output of one of the plurality of processing elements is an input to a subsequent one of the plurality of processing elements in the pipeline as part of a recursive division, and an input of a first one of the plurality of processing elements in the pipeline is an output of the shift register.

The modular reduction module includes a plurality of processing elements arranged in a pipeline configuration, each of the plurality of processing elements including a subtractor to output a quotient bit, for each subtraction performed by the subtractor, and a remainder value, for each subtraction performed by the subtractor that results in a positive value. The modular reduction module also includes a shift register to provide input to a first processing element among the plurality of processing elements, wherein each subsequent one of the plurality of processing elements in the pipeline configuration receives the quotient bit of the previous one of the plurality of processing elements in the pipeline configuration as an input after each subtraction.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments detailed herein relate to pipelined modular reductions and divisions.

As noted above, many encryption and computation applications require conversions that include performing multiple modular reductions (recursive division). Currently, these modular subtractions are implemented in a loop. The loop configuration requires the completion of each division result before proceeding with the next round. A pipelined configuration according to embodiments detailed herein facilitates initiating more than one round of division without waiting for the previous division result. This can decrease the time for the multiple modular reductions and divisions and decrease power dissipation.

Figure 1:
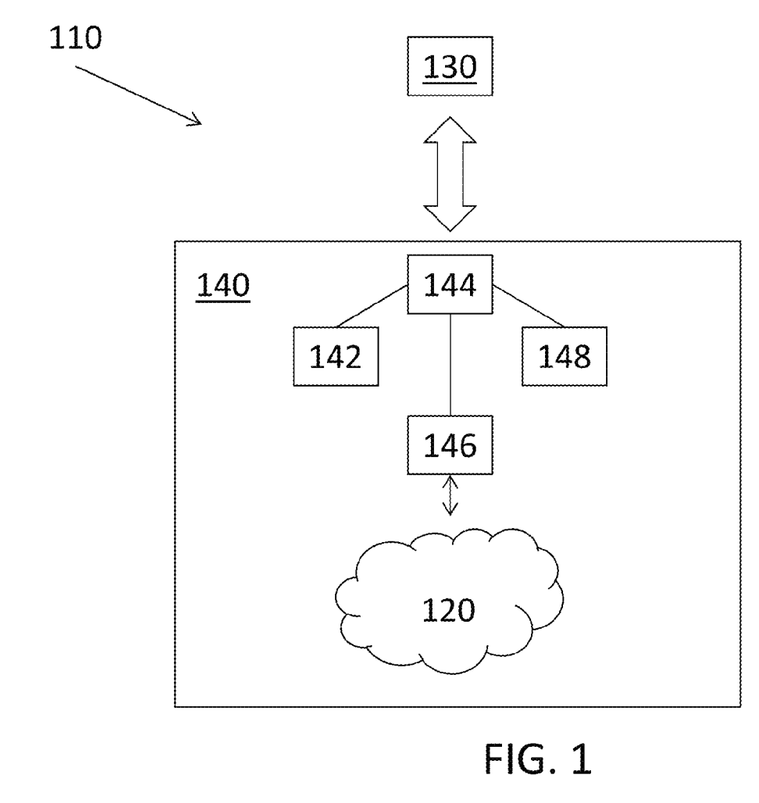
FIG. 1 is a block diagram of an exemplary system to perform an encryption or computation application according to embodiments.

FIG. 1 is a block diagram of an exemplary system 110 to perform an encryption or computation application according to embodiments. The system 110 includes a modular reduction module 130. The system 110 also includes an encryption or computation application 120 implemented by a processing circuit 140 or other hardware. The processing circuit 140 includes an input interface 142, one or more processors 144, one or more memory devices 146, and an output interface 148. The encryption or computation application 120 may be stored in the memory device 146. According to the embodiments discussed herein, implementation of the application 120 includes execution of a format preserving encryption algorithm or banking computations that, in turn, require the execution of (recursive divisions) multiple modular reductions and, optionally, divisions by the modular reduction module 130. The modular reduction module 130, further detailed below, includes one or more processing components in addition to components such as flip-flops. The modular reduction module 130 can be thought of as implementing a conversion algorithm. In exemplary applications, the conversion algorithm converts a number from one base to another (e.g., 64 hexadecimal number to decimal) or converts (e.g., binary) output of an encryption to a sequence of characters belonging to a predefined n-character alphabet. Using the alphabet conversion as an example, the conversion may be illustrated as follows:

Inputs:
    $B_j$ → jth 64-bit or 128-bit output block from encryption;
    k → number of characters to be extracted from $B_j$;
    n → number of characters of the target alphabet;
Output:
    D = {D[k-1], D[k-2],..., D[1], D[0]};
Algorithm Convert($B_j$,k,n):
    M=as_binary_integer($B_j$);
    for (i=1 to k),
    {   D[i] = M mod n;

-continued

```
    M = floor(M/n);
}
Return D
```

Figure 2:
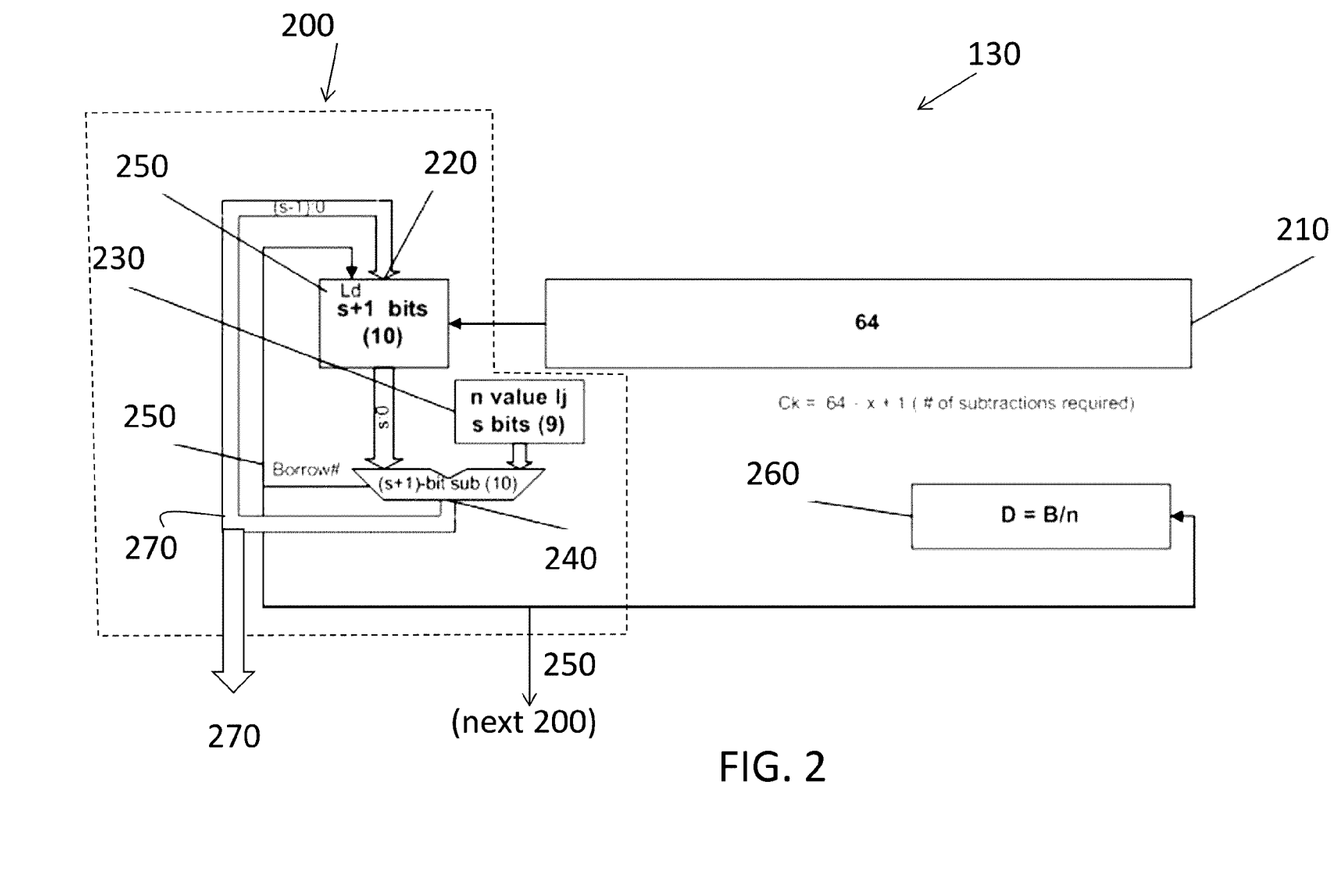
FIG. 2 illustrates a core process block of the modular reduction module according to embodiments.

FIG. 2 illustrates a processing element 200 of the modular reduction module 130 according to embodiments. The processing element 200 is configured to calculate A=B mod n and, optionally, D=B/n. The processing element 200 shown in FIG. 2 (the first processing element 200 in a pipeline) has an input from a shift register 210. The shift register 210 is a series of flip-flops, for example, and is initially loaded with the input string or number B to be modular reduced. While the exemplary shift register 210 is a 64-bit shift register, alternate embodiments are not limited to any particular bit length. With s representing the maximum number of bits required to represent the maximum n value to be supported, s' is the number of bits required to represent the value of n associated with the current operation. It bears noting that if the maximum value of n to be supported were 256, the modular reduction module 130 would need to support n=255 (s=8) because the solution for n=256 is trivial. The (s+1) bit subtractor 240 receives two inputs and provides two outputs. With regard to inputs of the (s+1) bit subtractor 240, one of the inputs is from the accumulator shift register 220 and the other is from the s-bit data bus 230 driving the value of n right justified. That is, the least significant bit of n is in the rightmost (least significant) position of the s-bit data bus 230. With regard to the outputs of the (s+1) bit subtractor 240, one is a quotient bit 250 which can be negative or borrow and the other is the remainder result 270 when the output is positive.

The least significant bit of the accumulator shift register 220 is always loaded with the most significant bit from the shift register 210. The next s' least significant bits of the accumulator shift register 220 are either shifted left (with the most significant bit being discarded) or loaded in parallel with the remainder result 270 output from the (s+1) bit subtractor 240. The s' least significant bits of the accumulator shift register 220 are loaded in parallel with the remainder result 270 when the (s+1) bit subtractor 240 output is not negative (the quotient bit 250, also referred to as the borrow# or borrow_out bit is inactive). When s' is smaller than the value of s used to size the hardware, the extra bit is unused and always zero. An optional quotient register 260 is used to obtain the quotient of the division B/n by storing each of the quotient bits 250 output from the (s+1) bit subtractor 240. Thus, the (s+1) bit subtractor 240 always outputs a quotient bit 250 after each subtraction and only outputs the remainder result 270 when the result of the subtraction is not negative. The quotient bit 250 may be used in the optional quotient register 260 and is also passed to the next processing element 200 in the pipeline. The remainder result 270 is fed back to the accumulator shift register 220 and is also output.

From a behavioral perspective, s' is the number of bits necessary to represent each character of the n-character alphabet. That is:

$$s' = \text{ceiling}[\log_2 n] \qquad [EQ. 1]$$

$$s = \text{ceiling}[\log_2 n_{max}] \qquad [EQ. 2]$$

where $n_{max}$ is the maximum value of n that must be supported. With b representing the number of bits of the input string B, the initialization includes the right justified n value driving the s-bit data bus 230, and the s' most significant bits of the string B being loaded or shifted from the shift register 210 into the accumulator shift register 220. The remaining (s+1-s') most significant bits of the accumulator shift register 220 are initialized to zero. Of those bits, the (s-s') most significant bits are not used and are always zero. The remaining (b−s') bits in the shift register 210 are left justified with the most significant bit being ready to be shifted into the accumulator shift register 220 in the next phase or cycle.

Figure 3:
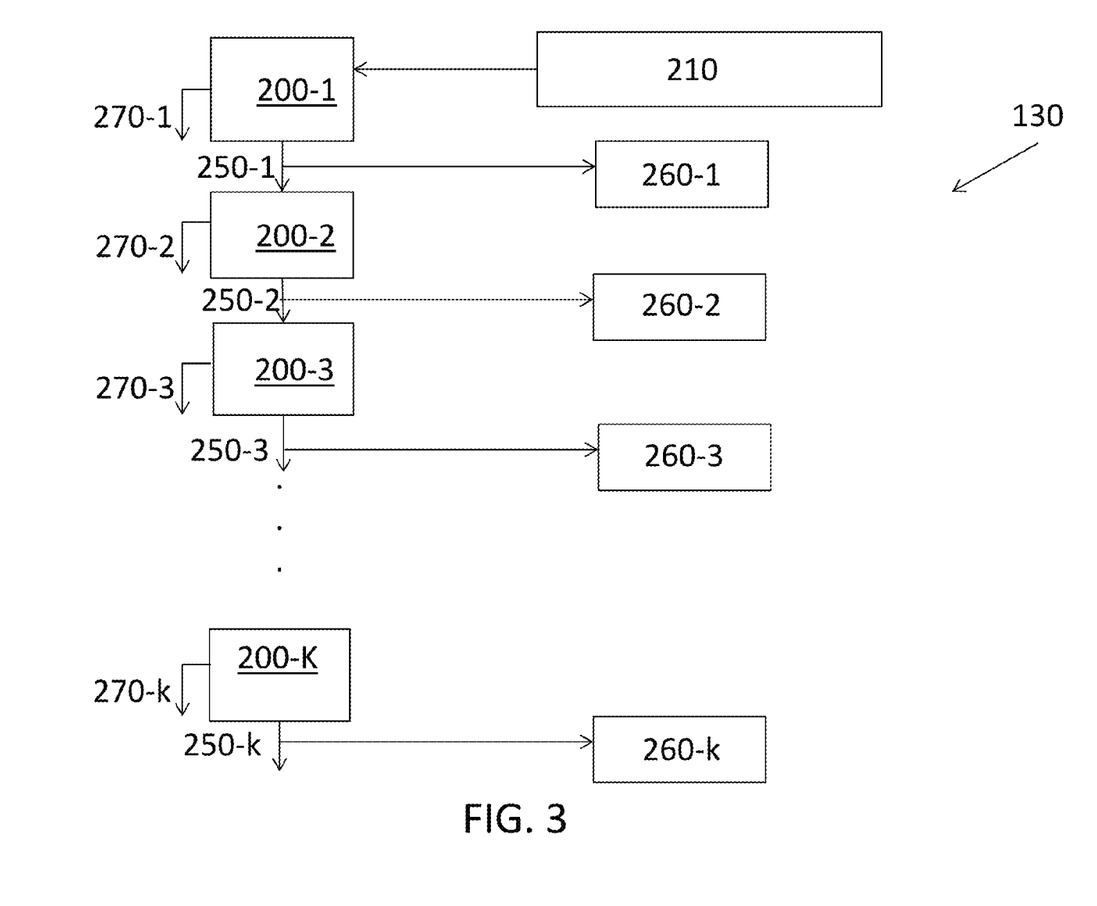
FIG. 3 is a block diagram of pipelined processing elements of the modular reduction module according to embodiments.

FIG. 3 is a block diagram of pipelined processing elements 200 of the modular reduction module 130 according to embodiments. The first processing element 200-1 (the one that has input from the shift register 210) implements the first (s+1) bit subtractor 240. When the result of the (s+1) bit subtractor 240 is positive (i.e., the quotient bit 250 or borrow_out bit is inactive), the most significant bit of the shift register 210 is shifted in the least significant bit of the accumulator shift register 220 and the s' least significant bits of the output of the (s+1) bit subtractor 240 (the remainder result 270) are stored in the next least significant positions of the accumulator shift register 220. This is the functional equivalent of loading the remainder result 270 of the (s+1) bit subtractor 240 into the s most significant bits of the accumulator shift register 220, because the (s−s') most significant bits are always zero. When, instead, the result of the (s+1) bit subtractor 240 is negative (i.e., the borrow_out 250 is active), the (s+1) bit subtractor 240 output is discarded and the value in the accumulator shift register 220 is shifted left, and the shift register 210 is used to load the least significant bit of the accumulator shift register 220. As noted above, when the optional quotient register 260 is used, the quotient bit 250 or borrow_out bit is shifted into the quotient register 260 from its right regardless of whether the value is zero or one. The quotient is produced when the quotient register 260 is loaded for (b−s'+1) clock cycles. The quotient bit 250 is provided as input to the next processing element 200, as further discussed below, and the remainder result 270 (output of (s+1) bit subtractor 240 when the output is not negative) is fed back to the accumulator shift register 220 and is also output, as shown in FIG. 2.

According to the present embodiment, the total number of processing elements 200 in the modular reduction module 130 is assumed to be equal to k (the number of characters to be extracted from the input string or number B). The accumulator shift register 220 of each of the other processing elements 200-2 through 200-k, respectively, in the pipeline is fed by the quotient bit 250-1 through 250-(k−1) (active low borrow_out bit) of each previous processing element 200-1 through 200-(k−1), respectively. After the first s' clock cycles, the first processing element 200-1 has loaded s' bits into the accumulator shift register 220 of the second processing element 200-2, and the second processing element 200-2 can start processing the incoming stream of bits as described above. After s' additional clock cycles, the third processing element 200-3 has enough bits (in the accumulator shift register 220) to start processing the incoming bit stream. The addition of processing by the next processing element 200 continues for each s' clock cycles. The recursive division is accomplished because each successive processing element 200 is fed the quotient being produced by the previous processing element 200. The first processing element 200-1 produces the result in (b−s'+1) clock cycles. The result from each subsequent pipelined processing element 200-2 through 200-k is available with one respective clock cycle delay after the previous processing element 200 result. For example, assuming a binary 64 bit value (b=64) is to be converted to a string of 19 characters (k=19) from an alphabet with 10 characters (base 10) ($s'$=ceiling[$\log_2(10)$]=4), 19 divisions are required. The results are obtained in (b−$s'$+1=64−4+1=61) clock cycles at the first processing element 200-1. An additional clock cycle is needed by each of the (k−1=18) additional processing elements 200-2 through 200-$k$. Thus, a total of (61+18) 79 clock cycles are needed using 19 9-bit ($s$+1) bit subtractors 240. The remainder results 270 (270-1 through 270-$k$) are collected from each processing element 200 after processing is complete. An exemplary mechanism by which it is determined when the processing is complete is detailed with reference to FIG. 5 below.

Figure 4:
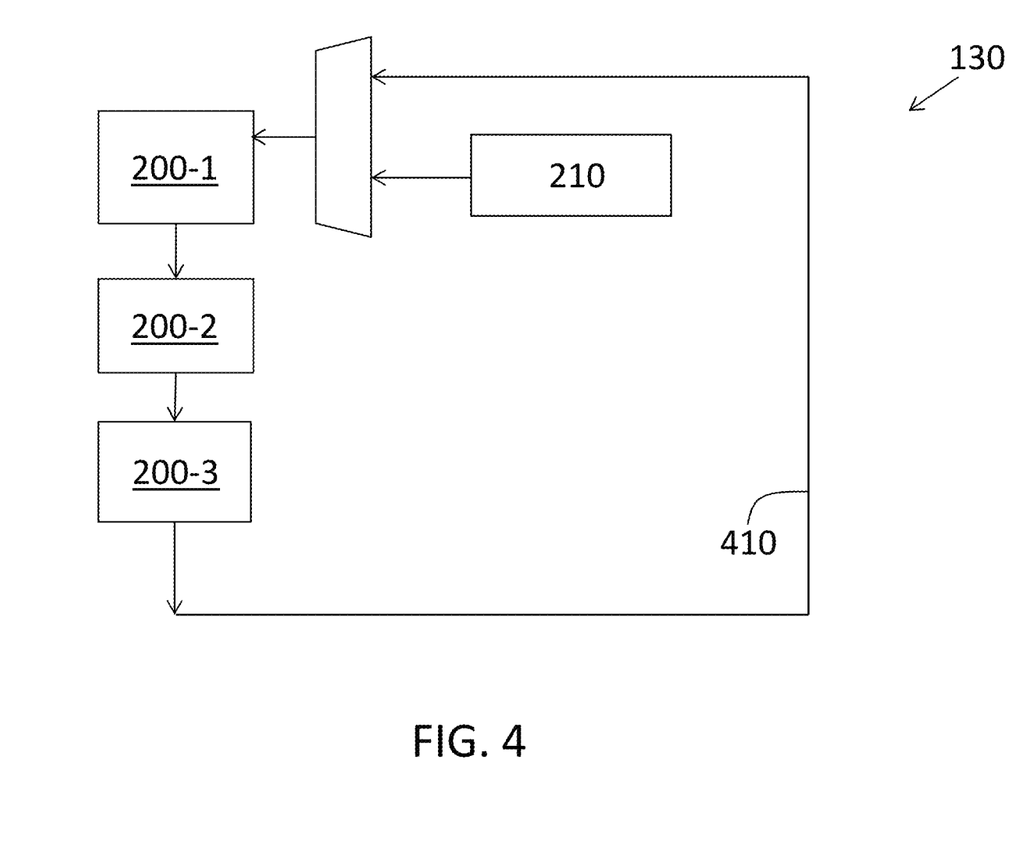
FIG. 4 is a block diagram of the modular reduction module according to another embodiment.

FIG. 4 is a block diagram of the modular reduction module 130 according to another embodiment. Although quotient registers 260 are not shown, they may be added to each of the processing elements 200 as shown in FIGS. 2 and 3. FIG. 4 illustrates an embodiment of the pipelined processing elements 200 that includes a feedback 410. The present embodiment results from recognition that the first stage processing element 200-1 becomes idle before the last processing element 200-3 has completed processing and can, therefore, be reused. While three processing elements 200-1, 200-2, 200-3 are shown, the feedback 410 (quotient bit 250 from the last processing element 200-3) may occur after a different number of processing elements 200 in alternative embodiments. By sending the feedback 410 (quotient bit 250) from the last processing element 200-3 to the first processing element 200-1, the number of stages of processing elements 200 need not be the same as (and can be less than) the number of output characters to be produced (k). Each of the processing elements 200 is re-initialized before being reused, and the previously produced output characters are saved.

Figure 5:
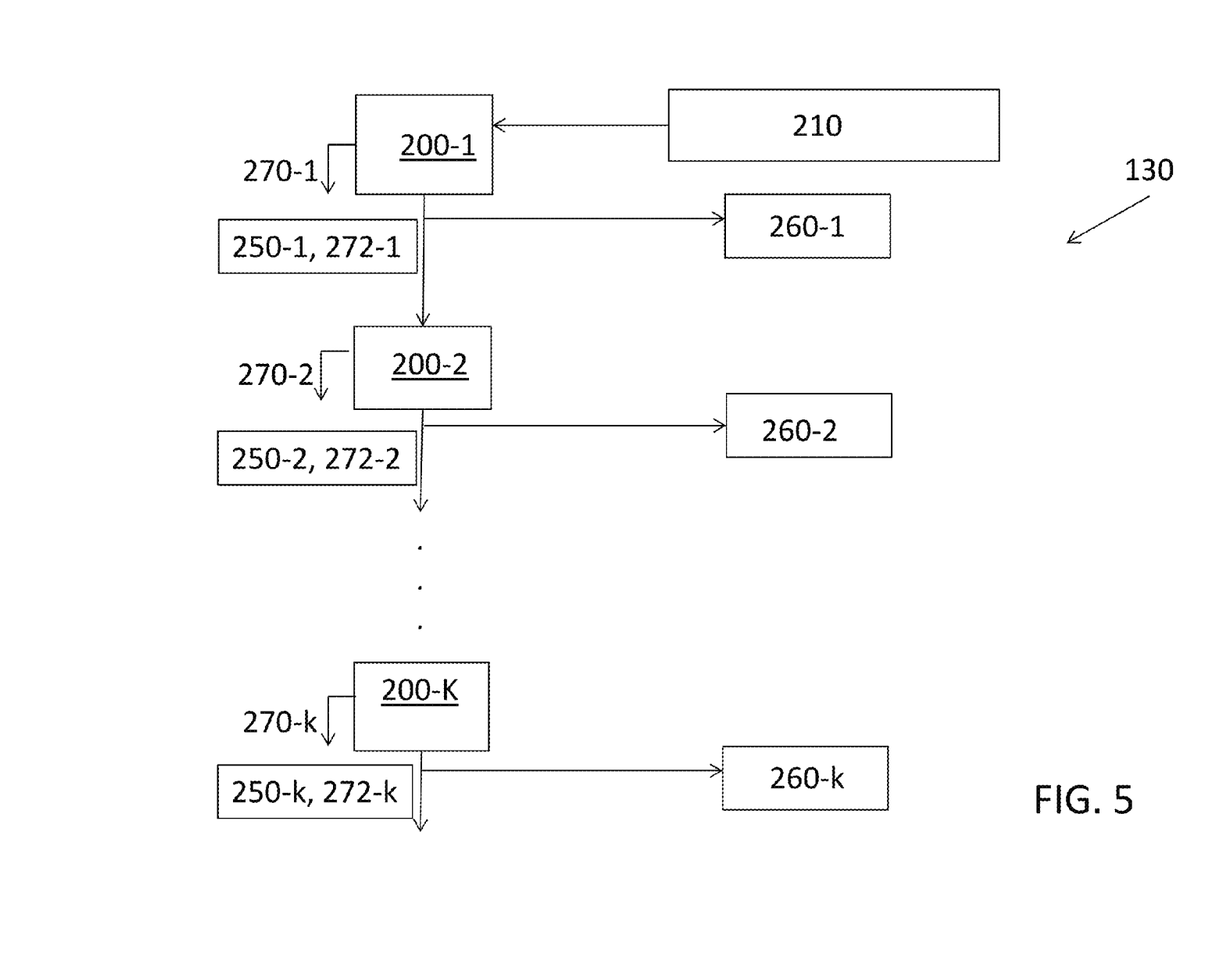
FIG. 5 is a block diagram of the modular reduction module according to an embodiment.

FIG. 5 is a block diagram of the modular reduction module 130 according to an embodiment. FIG. 5 is used to illustrate one embodiment for determining when processing at each processing element 200 is complete. In the exemplary modular reduction module 130 of FIG. 5, there is no feedback 410 (FIG. 4) and reuse of processing elements 200. However, the example discussed below also applies to the embodiment of the modular reduction module 130 shown in FIG. 4 with re-initialization as discussed above. As also discussed above, the first processing element 200-1 produces a result after (b−$s'$+1) clock cycles, and each subsequent processing element 200 in the pipeline produces a result one clock cycle after the previous processing element 200. The exemplary method described herein uses this information as a signal of completion of processing. As FIG. 5 shows, each processing element 200 outputs a remainder valid signal 272 (272-1 through 272-$k$) in addition to the quotient bit 250 (250-1 through 250-$k$) that loads an optional quotient register 260 (260-1 through 260-$k$) and the accumulator shift register of the next processing element 200 (200-2 through 200-$k$) in the pipeline. The remainder valid signal 272 of a given processing element 200 is output when the remainder result 270 of the respective processing element 200 is complete (processing by that processing element 200 is complete). In the case of the first processing element 200-1, this would mean that all values in the shift register 210 have been input to the accumulator shift register 220.

The remainder valid signal 272-1 of the first processing element 200-1 indicates to the next processing element 200-2 to output its remainder valid signal 272-2 one clock cycle after receiving the remainder valid signal 272-1. The remainder valid signal 272-2 of the second processing element 200-2 indicates to the next processing element 200-3 to output its remainder valid signal 272-3 one clock cycle after receiving the remainder valid signal 272-2, and so on. The last remainder valid signal 272-$k$ is output (indicating completion of the entire recursive division process by the modular reduction module 130) one clock cycle after the last processing element 200-$k$ receives the remainder valid signal 272-($k$−1) of the previous processing element 200-($k$−1) in the pipeline. Alternatively, each processing element 200 may generate the corresponding remainder valid signal 272 based on control logic, counter, or a combination of the two to determine when the final subtraction operation is complete.

Technical effects and benefits include execution of multiple modular reductions and divisions in a pipeline configuration that does not require completion of results from one stage to proceed to the next stage.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system to perform modular reductions, the system comprising:
   a shift register configured to store an input string or number;
   a plurality of processing elements arranged in a pipeline configuration and configured to convert the input string to a predefined alphabet or to convert the number to a different base based on a plurality of modular reductions, an output of one of the plurality of processing elements being a quotient bit that is an input to a subsequent one of the plurality of processing elements in the pipeline as part of a recursive division, and an input of a first one of the plurality of processing elements in the pipeline being an output of the shift register.

2. The system according to claim 1, further comprising a quotient register associated with each of the plurality of processing elements, each of the quotient registers determining a division result.

3. The system according to claim 1, further comprising a processing circuit implementing an encryption algorithm or a computation, the processing circuit loading the shift register with the input string or the number.

4. The system according to claim 1, wherein each of the plurality of processing elements includes an accumulator shift register, a data bus, and a subtractor, the accumulator shift register and the data bus providing input to the subtractor of each of the plurality of processing elements.

5. The system according to claim 4, wherein when an output of the subtractor of a processing element among the plurality of processing elements is a negative value, a bit is loaded into the accumulator shift register of a next processing element among the plurality of processing elements in the pipeline.

6. The system according to claim 4, wherein when an output of the subtractor of a processing element among the plurality of processing elements is a positive value, a bit is loaded into the accumulator shift register of a next processing element among the plurality of processing elements in the pipeline and, additionally, the output of the subtractor is fed back to the accumulator shift register of the processing element among the plurality of processing elements.

7. The system according to claim 1, wherein a number of the plurality of processing elements is equal to a number of characters of the input string or number to be converted with the plurality of processing elements.

8. The system according to claim 1, wherein a number of the plurality of processing elements is less than a number of characters of the input string or number to be converted with the plurality of processing elements, and a last processing element among the plurality of processing elements in the pipeline provides a feedback to the first one of the plurality of processing elements.

9. A method for implementing modular reductions, the method comprising:

loading a shift register with an input string or number; and converting, by a plurality of processing elements arranged in a pipeline configuration, the input string to a predefined alphabet or the number to a different base based on a plurality of modular reductions, wherein an output of one of the plurality of processing elements is a quotient bit that is an input to a subsequent one of the plurality of processing elements in the pipeline as part of a recursive division, and an input of a first one of the plurality of processing elements in the pipeline is an output of the shift register.

10. The method according to claim 9, further comprising implementing a division corresponding with each of the plurality of processing elements.

11. The method according to claim 9, further comprising executing, using a processor, an encryption algorithm or a computation, the executing including loading the shift register with the input string or the number.

12. The method according to claim 9, wherein the implementing the plurality of processing elements includes each of the plurality of processing elements performing a subtraction of bits in an accumulator shift register and a data bus.

13. The method according to claim 12, further comprising, when an output of the performing the subtraction in a processing element among the plurality of processing elements is a negative value, loading a bit into the accumulator shift register of a next processing element among the plurality of processing elements in the pipeline.

14. The method according to claim 12, further comprising, when an output of the performing the subtraction in a processing element among the plurality of processing elements is a positive value, loading a bit into the accumulator shift register of a next processing element among the plurality of processing elements in the pipeline and additionally feeding back the output to the accumulator shift register of the processing element among the plurality of processing elements.

15. The method according to claim 9, wherein the converting by the plurality of processing elements includes implementing a number of the processing elements equal to a number of characters of the input string or number to be converted with the plurality of processing elements.

16. The method according to claim 9, wherein the converting by the plurality of processing elements includes implementing a number of the processing elements less than a number of characters of the input string or number to be converted with the plurality of processing elements.

17. The method according to claim 16, further comprising a last processing element among the plurality of processing elements in the pipeline providing a feedback to the first one of the plurality of processing elements.

18. A modular reduction module, comprising:

a plurality of processing elements arranged in a pipeline configuration, each of the plurality of processing elements including a subtractor and configured to output a quotient bit, for each subtraction performed by the subtractor, and a remainder value, for each subtraction performed by the subtractor that results in a positive value; and a shift register configured to provide input to a first processing element among the plurality of processing elements, wherein each subsequent one of the plurality of processing elements in the pipeline configuration receives the quotient bit of the previous one of the plurality of processing elements in the pipeline configuration as an input after each subtraction.

19. The modular reduction module according to claim 18, further comprising a quotient register associated with each of the plurality of processing elements, the quotient register accumulating each quotient bit output by the subtractor of the respective one of the processing elements to generate a division result for the respective one of the processing elements.

20. The modular reduction module according to claim 18, wherein a number of clock cycles to complete processing by the modular reduction module is based on a length of the input provided by the shift register, each one of the plurality of processing elements outputs a remainder valid signal after completing processing, and a remainder valid signal of each of the plurality of processing elements is output based on receiving a remainder valid signal of a respective previous one of the plurality of processing elements.

* * * * *